(12) United States Patent
Russell, II et al.

(10) Patent No.: US 7,280,946 B2
(45) Date of Patent: Oct. 9, 2007

(54) METHOD AND ARRANGEMENT FOR DETERMINING PIN ENRICHMENTS IN FUEL BUNDLE OF NUCLEAR REACTOR

(75) Inventors: William Earl Russell, II, Wilmington, NC (US); Roland Otto Jackson, Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 575 days.

(21) Appl. No.: 10/425,611

(22) Filed: Apr. 30, 2003

(65) Prior Publication Data

US 2004/0236544 A1 Nov. 25, 2004

(51) Int. Cl.
G06G 7/48 (2006.01)
G21C 7/00 (2006.01)
G21C 19/00 (2006.01)
G21C 9/00 (2006.01)

(52) U.S. Cl. ............ 703/6; 376/241; 376/267; 376/305

(58) Field of Classification Search .......... 703/6; 376/241, 267, 305
See application file for complete search history.

(56) References Cited

U.S. PATENT DOCUMENTS

| | | | | |
|---|---|---|---|---|
| 5,272,736 A | * | 12/1993 | Wolters et al. | 376/267 |
| 5,790,616 A | * | 8/1998 | Jackson | 376/245 |
| 5,822,388 A | * | 10/1998 | Kantrowitz et al. | 376/435 |
| 6,181,762 B1 | * | 1/2001 | Akerlund et al. | 376/435 |
| 6,404,437 B1 | * | 6/2002 | Russell et al. | 345/473 |
| 6,891,912 B1 | * | 5/2005 | Lukic et al. | 376/267 |
| 2003/0086520 A1 | * | 5/2003 | Russell et al. | 376/259 |
| 2003/0123600 A1 | * | 7/2003 | Hesketh et al. | 376/435 |
| 2004/0101083 A1 | * | 5/2004 | Russell et al. | 376/256 |
| 2004/0122629 A1 | * | 6/2004 | Russell et al. | 703/2 |

(Continued)

OTHER PUBLICATIONS

Jie Zheng, Ph.D Personal Homepage. http://web.archive.org/web/20050212064902/http://www.cse.uiuc.edu/~jiezheng/welcome.html.*

(Continued)

*Primary Examiner*—Paul Rodriguez
*Assistant Examiner*—Ayal I. Sharon
(74) *Attorney, Agent, or Firm*—Harness, Dickey & Pierce, P.L.C.

(57) ABSTRACT

A method and arrangement of determining pin enrichments for a fuel bundle of a nuclear reactor, where a plurality of input parameters and target conditions may be input and enrichment changes, to be made across the fuel bundle, may be calculated using response matrix technology. Fuel bundle pin enrichment data may be output that satisfies the target conditions. The method and arrangement may enable production of fuel bundles having a desired local peaking, exposure peaking and R-factor performance. Consequently, given fuel cycles typically may be loaded and operated such that less fuel may be needed for identical cycle lengths, potentially resulting in improved fuel cycle economics. Additionally, because fuel bundle development may require fewer iterations, there may be a substantial cycle time reduction in the bundle design process, potentially reducing cost and enhancing profitability.

25 Claims, 9 Drawing Sheets

U.S. PATENT DOCUMENTS

| | | | |
|---|---|---|---|
| 2004/0122632 A1* | 6/2004 | Kropaczek et al. | 703/2 |
| 2004/0151274 A1* | 8/2004 | Kropaczek et al. | 376/215 |
| 2004/0191734 A1* | 9/2004 | Russell et al. | 434/218 |
| 2004/0220787 A1* | 11/2004 | Russell et al. | 703/6 |
| 2004/0243370 A1* | 12/2004 | Kropaczek et al. | 703/13 |
| 2005/0015227 A1* | 1/2005 | Kropaczek et al. | 703/6 |
| 2005/0086036 A1* | 4/2005 | Kropaczek et al. | 703/6 |

OTHER PUBLICATIONS

Jie Zheng, T. Guo and G.I. Maldonado, "An Application of Linear Superposition to Estimating Lattice Physics Parameters." Nuclear Science and Engineering 137:2 (Feb. 2001).*

Jie Zheng and G. Ivan Maldonado, "Parallel Generation of Linear Superposition Libraries within Nuclear Fuel Lattice Loading Optimization." The 2000 International Conference on Parallel and Distributed Processing Techniques and Applications (PDPTA'2000). Jun. 26-29, 2000. Las Vegas, Nevada, USA.*

G.I. Maldonado, J. Zheng, and T. Guo, "Separability of Perturbations within a Superposition-Based Lattice Physics Model." Trans. Am. Nucl. Soc.. 80:234 (Jun. 1999).*

T. Guo, Jie Zheng, G. I. Maldonado and Greg H. Hobson, "Lattice Loading Optimization Within a 4X1/4 Assembly Colorset." Trans. Am. Nucl. Soc., 81:74 (1999).*

G. Ivan Maldonado and Jie Zheng, "Approximation of Lattice-Physics Parameters Via Linear Superposition." Trans. Am. Nucl. Soc., 79:317 (1998).*

Aapo Tanskanen and Matti Tarvainen, "Assessment of the Neutron and Gamma Sources of the Spent BWR Fuel." Oct. 2000. Finnish Radiation and Nuclear Safety Authority.*

U.S. Nuclear Regulatory Commission. "NUREG-1567: Standard Review Plan for Spent Fuel Dry Storage Facilities." Mar. 2000. Table of Contents and Section 8.*

Kropaczek and Turinsky. "Fuel Management Optimization." Nuclear Technology. Jul. 1991. vol. 95. pp. 21-32.*

Kropaczek, D.J. and W.E. Russell. "Method for Optimization of BWR Fuel Management and Plant Operations." Advances in Nuclear Fuel Management III (ANFM 2003). Oct. 5-8, 2003. pp. 1-12.*

* cited by examiner

FIG. 5A

Base Lattice Design – Average Enrichment = 4.491

| 1.60 | 2.40 | 3.20 | 3.95 | 4.40 | 4.40 | 3.95 | 3.95 | 3.20 | 2.40 |
|---|---|---|---|---|---|---|---|---|---|
| 2.40 | 3.60 | 3.95 | 4.90 | 4.90 (6.0) | 4.90 | 4.90 | 4.90 (6.0) | 4.90 | 3.60 |
| 3.20 | 3.95 | 4.90 | 4.90 (6.0) | 4.90 | 4.90 | 4.90 | 4.90 | 4.90 (6.0) | 4.40 |
| 3.95 | 4.90 | 4.90 (6.0) | 4.90 | 4.90 | 0.00 | 0.00 | 4.90 | 4.90 | 4.90 |
| 4.40 | 4.90 (6.0) | 4.90 | 4.90 | 4.90 | 0.00 | 0.00 | 4.90 (6.0) | 4.90 | 4.90 |
| 4.40 | 4.90 | 4.90 | 0.00 | 0.00 | 4.90 | 4.90 | 4.90 | 4.90 (6.0) | 4.90 |
| 3.95 | 4.90 | 4.90 | 0.00 | 0.00 | 4.90 | 4.90 | 4.90 | 4.90 | 4.90 |
| 3.95 | 4.90 (6.0) | 4.90 | 4.90 | 4.90 (6.0) | 4.90 | 4.90 | 4.90 | 4.90 (6.0) | 4.90 |
| 3.20 | 4.90 | 4.90 (6.0) | 4.90 | 4.90 | 4.90 (5.0) | 4.90 | 4.90 (6.0) | 4.90 | 4.40 |
| 2.40 | 3.60 | 4.40 | 4.90 | 4.90 | 4.90 | 4.90 | 4.40 | 4.40 | 3.20 |

FIG. 5B

AUTOBUN Lattice Design – Average Enrichment = 4.293
(+,- indicates changes from base)

| 1.60 | -2.00 | -2.80 | -3.60 | -3.95 | -3.95 | 3.95 | -3.60 | 3.20 | -2.00 |
|---|---|---|---|---|---|---|---|---|---|
| -2.00 | -3.20 | -3.20 | 4.90 | 4.90 (6.0) | -4.40 | 4.90 | 4.90 (6.0) | -4.40 | -3.20 |
| -2.80 | -3.20 | -3.95 | 4.90 (6.0) | 4.90 | 4.90 | 4.90 | 4.90 | 4.90 (6.0) | -3.95 |
| -3.60 | 4.90 | 4.90 (6.0) | 4.90 | 4.90 | 0.00 | 0.00 | 4.90 | 4.90 | -4.40 |
| -3.95 | 4.90 (6.0) | 4.90 | 4.90 | 4.90 | 0.00 | 0.00 | 4.90 (6.0) | 4.90 | -4.40 |
| -3.95 | -4.40 | 4.90 | 0.00 | 0.00 | 4.90 | 4.90 | 4.90 | 4.90 (6.0) | 4.90 |
| 3.95 | 4.90 | 4.90 | 0.00 | 0.00 | 4.90 | 4.40 | 4.90 | 4.90 | 4.90 |
| -3.60 | 4.90 (6.0) | 4.90 | 4.90 | 4.90 (6.0) | 4.90 | 4.90 | 4.90 | 4.90 (6.0) | -4.40 |
| 3.20 | 4.40 | 4.90 (6.0) | 4.90 | 4.90 | 4.90 (6.0) | 4.90 | 4.90 (6.0) | 4.90 | -3.95 |
| -2.00 | -3.20 | -3.95 | -4.40 | -4.40 | 4.90 | 4.90 | -4.40 | -3.95 | -2.80 |

FIG. 7A

Base Lattice Design – Average Enrichment = 4.302

| 1.60 | 2.00 | 2.80 | 3.60 | 3.95 | 3.95 | 3.95 | 3.60 | 3.20 | 2.00 |
|---|---|---|---|---|---|---|---|---|---|
| 2.00 | 3.20 | 3.20 | 4.90 | 4.90 (5.0) | 4.40 | 4.90 | 4.90 (5.0) | 4.40 | 3.20 |
| 2.80 | 3.20 | 3.60 | 4.90 (5.0) | 4.90 | 4.90 | 4.90 | 4.90 | 4.90 (5.0) | 3.95 |
| 3.60 | 4.90 | 4.90 (5.0) | 4.90 | 4.90 | 0.00 | 0.00 | 4.90 | 4.90 | 4.40 |
| 3.95 | 4.90 (5.0) | 4.90 | 4.90 | 4.90 | 0.00 | 0.00 | 4.90 (5.0) | 4.90 | 4.40 |
| 3.95 | 4.40 | 4.90 | 0.00 | 0.00 | 4.90 | 4.90 | 4.90 | 4.90 (5.0) | 4.90 |
| 3.95 | 4.90 | 4.90 | 0.00 | 0.00 | 4.90 | 4.40 (2.0) | 4.90 | 4.90 | 4.90 |
| 3.60 | 4.90 (5.0) | 4.90 | 4.90 | 4.90 (5.0) | 4.90 | 4.90 | 4.90 (5.0) | 4.90 | 4.40 |
| 3.20 | 4.40 | 4.90 (5.0) | 4.90 | 4.90 | 4.90 (5.0) | 4.90 | 4.90 | 4.90 | 3.95 |
| 2.00 | 3.20 | 3.95 | 4.40 | 4.40 | 4.90 | 4.90 | 4.40 | 3.95 | 2.80 |

FIG. 7B

AUTOBUN Lattice Design – Average Enrichment = 4.293
(+,- indicates changes from base)

| 1.60 | +2.40 | +3.20 | 3.60 | 3.95 | 3.95 | 3.95 | +3.95 | 3.20 | +2.40 |
|---|---|---|---|---|---|---|---|---|---|
| +2.40 | 3.20 | +3.60 | 4.90 | -3.95 (5.0) | -3.60 | 4.90 | -3.95 (5.0) | 4.40 | +3.60 |
| +3.20 | +3.60 | -3.20 | -4.40 (5.0) | -3.95 | 4.90 | 4.90 | 4.90 | 4.90 (5.0) | +4.40 |
| 3.60 | 4.90 | -4.40 (5.0) | -4.40 | 4.90 | 0.00 | 0.00 | 4.90 | 4.90 | +4.90 |
| 3.95 | -3.95 (5.0) | -3.95 | 4.90 | 4.90 | 0.00 | 0.00 | 4.90 (5.0) | 4.90 | +4.90 |
| 3.95 | -3.60 | 4.90 | 0.00 | 0.00 | 4.90 | 4.90 | 4.90 | 4.90 (5.0) | 4.90 |
| 3.95 | 4.90 | 4.90 | 0.00 | 0.00 | 4.90 | +4.90 (2.0) | 4.90 | 4.90 | 4.90 |
| +3.95 | -3.95 (5.0) | 4.90 | 4.90 | 4.90 (5.0) | 4.90 | 4.90 | 4.90 (5.0) | 4.90 | 4.40 |
| 3.20 | 4.40 | 4.90 (5.0) | 4.90 | 4.90 | 4.90 (5.0) | 4.90 | 4.90 | 4.90 | 3.95 |
| +2.40 | +3.60 | +4.40 | +4.90 | +4.90 | 4.90 | 4.90 | 4.40 | 3.95 | 2.80 |

L-Peak Iteration
(GE12 - 24334)

R-Factor Iteration
(GE12 - 24334)

Perturbation in Corner Rod Enrichment
(+0.2 wt% U235)

METHOD AND ARRANGEMENT FOR DETERMINING PIN ENRICHMENTS IN FUEL BUNDLE OF NUCLEAR REACTOR

BACKGROUND OF THE INVENTION

1. Field of the Invention

This invention relates generally to nuclear reactors, and more particularly to determining pin enrichments in fuel assemblies of a nuclear reactor.

2. Related Art

A boiling water reactor (BWR) or pressurized water reactor (PWR) typically operates from one to two years before requiring fuel replacement. This period is referred to as a fuel cycle or energy cycle. Upon completion of a cycle, approximately ¼ to ½ (typically about ⅓) of the least reactive fuel in the reactor is discharged to a spent fuel pool. The number of fuel assemblies (e.g., fuel bundles) discharged typically are replaced by an equal number of fresh fuel assemblies (e.g., fresh bundles).

The fresh bundles may vary in bundle average enrichment (the average % of enriched uranium (U235) and poisons (such as gadolinium) across the bundle, determined by the total weight of U235 and gadolinia in the bundle divided by the weight of the bundle, local peaking characteristics, exposure peaking, R-factor characteristics, and overall exposure dependent reactivity. Exposure peaking and R-factors are, in fact, functions of local peaking and their behavior may be defined, without loss in generality, by considering local peaking only. The exposure dependent local peaking factor of the fresh bundle may be determined from the maximum local peaking value in any pin (e.g., a pin is a particular fuel rod in a fuel bundle or assembly) of the fresh bundle in question. The higher the local peaking factor, the higher the Maximum Average Planar Linear Heat Generation Rate (MAPLHGR), which is a power related limit on nuclear fuel. Similarly, the R-Factor for the fresh bundle may be determined from the maximum R-Factor in any pin of the fresh bundle in question. When coolant in a core can no longer remove heat at a sufficient rate the fuel and clad temperature will start to increase rapidly. This boiling transition condition may be known as film dryout, burnout, departure from nucleate boiling, depending on the actual conditions leading to the temperature excursion. For BWR fuel, the boiling transition phenomenon may be referred to as dryout. An R-factor value may be a value correlating thermal hydraulic variables (such as flow rate, inlet subcooling, system pressure, hydraulic diameter) to a lattice fuel rod power peaking distribution. The local power in the bundle is a function of the individual rods surrounding an affected rod; thus the weighted local power factor is called an R-factor. Exposure peaking is related to the integral of the local peaking of each individual fuel pin and is constrained by the maximum licensed exposure capability of the fuel.

Because local peaking and R-factor values in any fuel bundle are directly proportional to MAPLHGR limits (KW/ft limits) and minimum critical power ratio (MCPR) limits, it is beneficial to minimize the local peaking and R-factor values while meeting other criteria such as bundle average enrichment, hot-to-cold swing (reactivity excursion at beginning of cycle (BOC) from hot, uncontrolled conditions to cold, controlled conditions), and overall exposure dependent reactivity. Exposure peaking must also be considered at the design time, as a high exposure peaking factor limits the maximum bundle exposure and therefore the maximum reload enrichment that can be loaded in the reactor.

Currently, design engineers utilize "rules of thumb" regarding the relative relationship between enrichment and the dependent effects of local peaking exposure peaking and R-Factor on fuel bundle performance. Therefore, pin enrichments throughout a reactor core are iterated by hand. Resulting bundles would be considered finished even though additional improvements could have been performed. Alternatively, bundle designs would take a large amount of iterations and time to perform.

The current process to make modifications to an existing bundle design to meet the requirements of a core design and operating strategy involves extracting information from a detailed fuel cycle simulation, converting this information into fuel characteristic changes, and then modifying a two-dimensional (2D) enrichment and gadolinium pin placement (e.g., 2D enrichment distribution) to yield these changes. This process is significantly complex, as looping through design iterations is time consuming, since the current code used to implement the rules of thumb and to perform these iterations is inefficient and laborious. A single iteration typically takes from about 4 hours to the better part of a day, with extensive cost in terms of manpower. Thus, very few iterations are typically performed, due to the difficulty and time needed to perform a single iteration using the aforementioned thumb rules and code.

Additionally, designers have become increasingly frustrated as to how inaccurate "rules of thumb" about how changing enrichment in a given pin would effect the resulting local peaking and R-factors for a given bundle (e.g., secondary effects). Because a large number of fresh fuel bundles are typically required for a given fuel cycle, if the "rule of thumb" used in the iterations is erroneous, which frequently may be the case, the efforts and man hours used to model the bundle are wasted. Accordingly, the resulting core design of fresh fuel assemblies for a prospective fuel cycle may not be as effective as it could be in minimizing the local peaking and R-factor while meeting other criteria such as bundle average enrichment, hot-to-cold swing, and overall exposure dependent reactivity.

SUMMARY OF THE INVENTION

Exemplary embodiments of the invention describe a method and arrangement of determining pin enrichments for a fuel bundle of a nuclear reactor, where a plurality of input parameters and target conditions may be input, and enrichment changes to be made across the fuel bundle may be calculated using response matrix technology. Fuel bundle pin enrichment data may be output that satisfies the target conditions. For clarity, and with no loss in generality, the invention will be described in terms of local peaking with the understanding that the invention applies also to exposure peaking, R-factors and any other exposure dependent characteristic defined by the arrangement of 2-D pin enrichments in the lattice design.

BRIEF DESCRIPTION OF THE DRAWINGS

The present invention will become more fully understood form the detailed description given herein below and the accompanying drawings, wherein like elements are represented like reference numerals which are given by way of illustration only and thus are not limitative of the present invention and wherein:

FIGS. 5A and 5B illustrate 2D lattice enrichment distributions for a fuel bundle modeled in accordance with an exemplary embodiment of the invention;

FIGS. 7A and 7B illustrate 2D lattice enrichment distributions after core simulation of a fuel bundle determined in accordance with an exemplary embodiment of the invention;

DETAILED DESCRIPTION

As used herein, the term "pin" may be a particular fuel rod in a fuel bundle (fuel assembly); thus the terms pin and fuel rod may be used synonymously in this disclosure. Additionally, a response surface model hereafter may be referred to as both a response surface matrix or a response surface.

The method and arrangement for determining pin enrichments for a fuel bundle of a nuclear reactor may include a graphical user interface (GUI) and a processing medium (e.g., software-driven program, processor, application server, etc.) to enable a user to determine pin enrichments for a fuel bundle of a nuclear reactor. The arrangement may provide feedback to the user, based on how closely pin enrichment determinations meet constraints.

The method and arrangement may determine a 2D enrichment distribution that satisfies target local peaking and R-factor requirements for a particular fuel bundle lattice design (e.g., 9×9, 10×10, etc.), and may adjust the 2D enrichment distribution to achieve a different lattice average enrichment then was determined from a previous, or base fuel bundle lattice design. In another exemplary embodiment, pin enrichment determination may be facilitated by using an optional bundle enrichment analysis or search option, and/or by using an optional simplification technique. The enrichment search option may enable bundle enrichment to be kept within specified enrichment criteria. The simplification technique may enable bundles to be designed with a reduced number of fuel rod (pin) types. Consequently, bundles that function well in a particular reactor can be designed that also are less costly to build, as the manufacturing process may be streamlined.

The exemplary embodiments of the present invention may provide several advantages. The method and arrangement may enable production of fuel bundles having a desired local peaking and R-factor performance. Consequently, given fuel cycles typically may be loaded and operated such that less fuel may be needed for identical cycle lengths, potentially resulting in improved fuel cycle economics. Additionally, because fuel bundle development may require fewer iterations, there may be a significant cycle time reduction in the bundle design process, potentially reducing cost and enhancing profitability.

Figure 1:
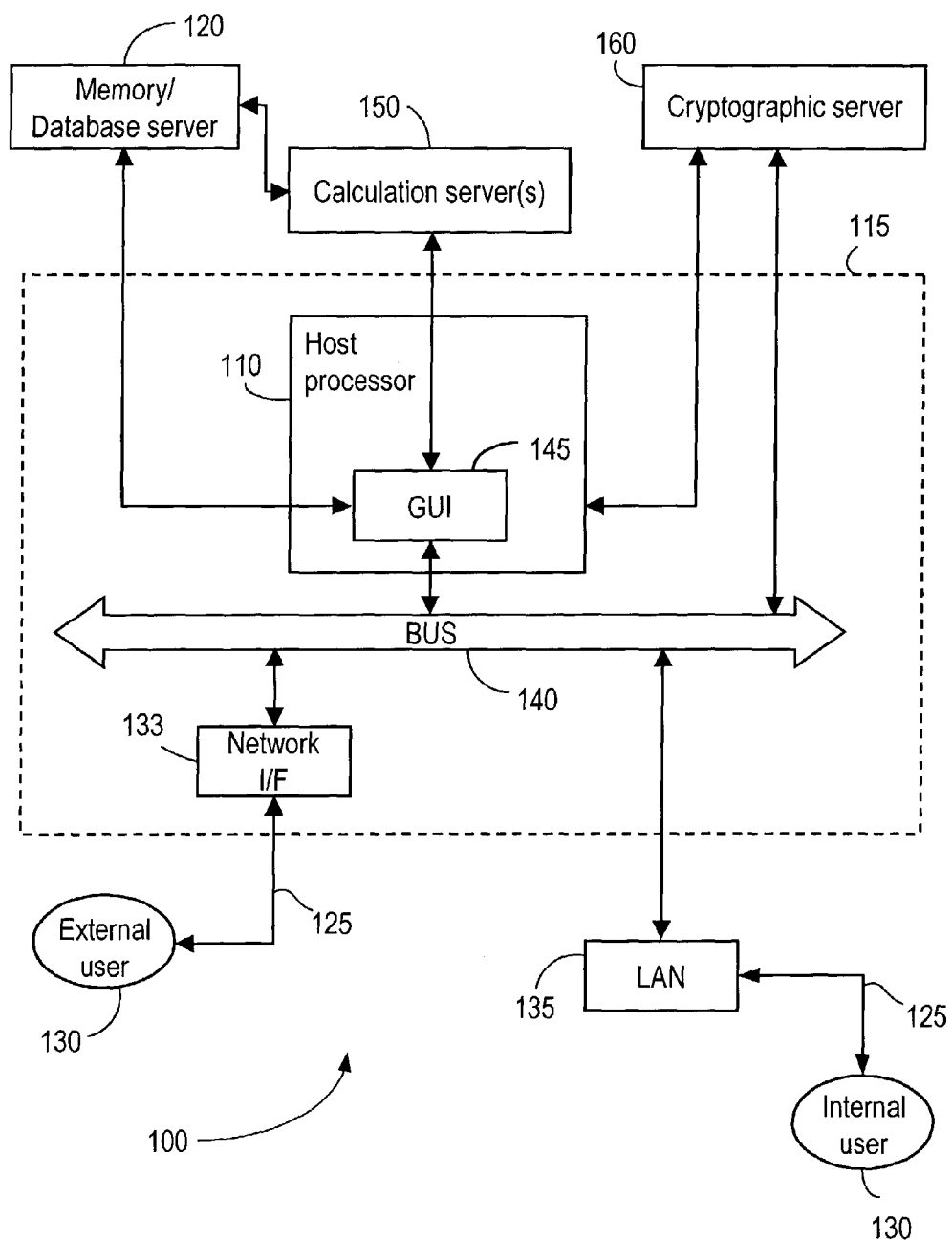
FIG. 1 illustrates an arrangement for implementing the method in accordance with an exemplary embodiment of the invention.

FIG. 1 illustrates an arrangement for implementing the method in accordance with and exemplary embodiment of the invention. Referring to FIG. 1, arrangement 100 may include a processor 110 that communicates with an internal memory 120, which may contain the database that stores the response surface. Processor 110 represents a central nexus from which real time and non-real functions in arrangement 100 may be performed, such as graphical-user interface (GUI) and browser functions, directing all calculations and accessing of data in order to determine pin enrichments for a fuel bundle, and for the creation of suitable graphical representations of various features of the modeled fuel bundle. For example, processor 110 may be constructed with conventional microprocessors such as currently available PENTIUM processors which may direct security functions, direct calculations such as pin-by-pin enrichment changes across an entire fuel bundle, direct calculations related to a bundle enrichment search option analysis or to a simplification technique to reduce the number of pellet types used in a selected bundle lattice design, etc., for display and review by the user.

Arrangement 100 could be embodied as a network. Processor 110 could be part of an application server 115 (shown in dotted line) on the network for access by both internal and external users 130, via suitable encrypted communication medium such as an encrypted 128-bit secure socket layer (SSL) connection 125, although the present invention is not limited to this encrypted communication medium. Hereinafter, the term user may refer to both an internal user and an external user. A user could connect to the network and input data or parameters over the internet from any one of a personal computer, laptop, personal digital assistant (PDA), etc., using a suitable input device such as a keyboard, mouse, touch screen, voice command, etc., and a network interface 133 such as a web-based internet browser. Further, processor 110 on such a network could be accessible to internal users 130 via a suitable local area network (LAN) 135 connection, for example.

The graphical information may be communicated over the 128-bit SSL connection 125 or LAN 135, to be displayed on a suitable terminal unit such as a display device of the user 130, PDA, PC, etc. For example, a user 130 may be any of a representative of a nuclear reactor plant accessing the website to determine a core design for his or her nuclear reactor, a vendor hired by a reactor plant site to develop core designs using the exemplary embodiments of the present invention, or any other user authorized to receive or use the information generated by the exemplary embodiments of the present invention.

Processor 110 may be operatively connected to a cryptographic server 160. Accordingly, processor 110 may implement all security functions by using the cryptographic server 160, so as to establish a firewall to protect the arrangement 100 from outside security breaches. Further, cryptographic server 160 may secure all personal information of all users registered with a website hosting a program implemented by the method and arrangement in accordance with the exemplary embodiment of the invention.

If processor 110 is part of an application server 115 on a network, for example, conventional bus architectures may be used to interface between components, such as peripheral components interconnect (PCI) bus (140) that is standard in many computer architectures. Alternative bus architectures such as VMEBUS, NUBUS, address data bus, RAMbus, DDR (double data rate) bus, etc. could of course be utilized to implement such a bus Processor 110 may include a GUI 145, which may be embodied in software as a browser. Browsers are software devices which present an interface to, and interact with, users of the arrangement 100. The browser is responsible for formatting and displaying user-interface components (e.g., hypertext, window, etc.) and pictures.

Browsers are typically controlled and commanded by the standard hypertext mark-up language (HTML). Additionally, or in the alternative, any decisions in control flow of the GUI 145 that require more detailed user interaction may be implemented using JavaScript. Both of these languages may be customized or adapted for the specific details of a implementation, and images may be displayed in the browser using well known JPG, GIF, TIFF and other standardized compression schemes, other non-standardized languages and compression schemes may be used for the GUI 145, such as XML, "home-brew" languages or other known non-standardized languages and schemes.

As noted above, processor 110 may perform all the calculations required to process user entered data, such as generation of and use of a response surface matrix stored in memory 120, as to be described in further detail below, and to provide results, which may be embodied as a two-dimensional (2D) enrichment map with estimated R-factor and local peaking data for a particular lattice design, for example, an/or other plant related data associated with the determination of pin enrichments, as to be discussed further below. This data which may be displayed via, the GUI 145, under the direction of processor 110.

Memory 120 may integral with processor 110, external, configured as a database server, and/or may be configured within a relational database server, for example, that may be accessible by processor 110. Memory 120 may store a response surface model to be described in further detail hereafter. The response surface model may be used by processor 110 to determine enrichment changes to be made across a fuel bundle. Alternatively, instead of processor 110 performing the calculations, processor 110 may direct a plurality of calculation servers 150, which could be embodied as Windows 2000 servers, for example, to perform the calculations using the response surface model. Further, the exemplary embodiments of the present invention may be implemented by a software program driven by processor 110 and implemented at the calculation servers 150, with calculation servers having access to memory 120.

Exemplary embodiments of the present invention may utilize a response surface matrix in order to determine changes in enrichment, local peaking, exposure peaking and R-factor for a given fuel bundle lattice. A response surface in accordance with the exemplary embodiments may define relationships between design inputs, including characteristics such as bundle data related to MCPR, MAPLHGR and maximum fraction of limiting power density (MFLPD), which is a ratio of the local LHGR to a linear heat generation rate limit curve (LHGRlimit), characteristics such as R-factor data of a base lattice design to be evaluated, lattice data such as current fuel and poison enrichments in the base lattice design, etc., and one or more operational outputs (i.e., reactor power, flow rate, cycle time, etc.) of a reactor core design using the evaluated fuel bundle.

Local Peaking Factor and Enrichment

Initially with regard to lattice local peaking factors, a given lattice design iteration in accordance with the exemplary embodiments of the invention may be determined using a response surface matrix as described by the following expression (1), where the change in local peaking factors is a function of the individual fuel rod enrichment changes.

$$\begin{bmatrix} \Delta P_1 \\ \Delta P_2 \\ . \\ . \\ \Delta P_n \end{bmatrix} = \begin{bmatrix} \frac{\partial P_1}{\partial e_1} & \frac{\partial P_1}{\partial e_2} & \cdots & \frac{\partial P_1}{\partial e_n} \\ \frac{\partial P_2}{\partial e_1} & \frac{\partial P_2}{\partial e_2} & \cdots & \\ & & . & \\ \frac{\partial P_n}{\partial e_1} & & & \frac{\partial P_n}{\partial e_n} \end{bmatrix} \times \begin{bmatrix} \Delta e_1 \\ \Delta e_2 \\ . \\ . \\ \Delta e_n \end{bmatrix} \quad (1)$$

The n×n matrix in expression (1) corresponds to a response surface matrix, where each element may be defined as:

$$\frac{\partial p_i}{\partial e_j}$$

the change in local peaking in pin(i) for a change of enrichment in pin(j)

where $\Delta e_i$ is the change in pellet enrichment in fuel rod I; and $\Delta P_i$ is the change in local peaking in fuel rod i.

The diagonal elements (i=j) in expression (1) may be equivalent to the "rules of thumb" used in the manual iteration process. The second order (physical) effects, represented by the off diagonal elements, are rarely known and thus ignored. This is a limitation of the conventional iteration process, since the second order terms may be significant, and without consideration, the number of design iterations may increase. If the design engineer is experienced, then he/she may have some "mental" second order terms to apply. However, such memorized second order terms may vary from product to product or lattice type to lattice type such that constant "learning" would be required. Thus, the second order terms are ignored.

A designer may take the actual changes (standard pellet versus calculated pellet enrichments) and estimate what the local peaking, exposure peaking and R-factor changes will be a-priori from expression (1). In this way the designer can review their choices of enrichment changes and make necessary modifications before repeating the physics calculations. This may be useful when trying to simplify the fuel bundle design by combining fuel rods of different enrichments, for example.

If enrichment is changed (either up or down) in a given lattice location, the local pin power may be expected to go up or down by some amount. This amount is $$\frac{\partial p_i}{\partial e_i}$$

in expression (1) above. Other fuel pins near the changed fuel pin may also change in power. This response represents the off diagonal terms in expression (1).

Figure 9:
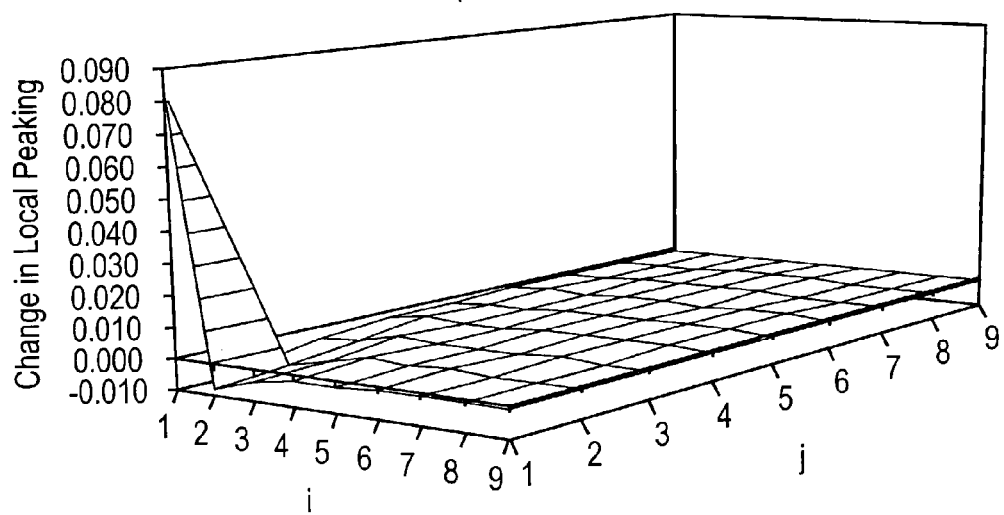
FIG. 9 illustrates an impact on local power peaking distribution resulting from a change in a single pin enrichment in accordance with an exemplary embodiment of the invention.

FIG. 9 illustrates an impact on local power peaking distribution resulting from the change in a single pin enrichment in accordance with exemplary embodiments of the invention. FIG. 9 graphically illustrates an individual perturbation within a response surface for a single pin location in a bundle, and in this exemplary case pin locations for an exemplary 9×9 fuel bundle are shown, with (i, j) notation representing pin locations (fuel rod locations). Thus, at (1,1), the enrichment had been increased by 0.2 wt % U235. As a result of this change in enrichment at the (1,1) location, the local peaking in the (1,1) location increased by approximately 0.08 and the local peaking in the (2,1) location and (1,2) location decreased by approximately 0.01.

In the case of lattice design where the lattice local peaking and R-factors is a concern, target conditions or goals may be needed in the form of exposure dependent limits. One source for this input is a BUNGI computer program. BUNGI furnishes both exposure dependent local peaking and exposure dependent R-factor targets. Since the target local peaking factor versus exposure values are known (via the BUNGI program) and the lattice local peaking factors from the last fuel bundle design iteration are also known, required enrichment changes may be predicted from expression (2).

$$\begin{bmatrix} \Delta e_1 \\ \Delta e_2 \\ . \\ . \\ \Delta e_n \end{bmatrix} = \begin{bmatrix} \frac{\partial P_1}{\partial e_1} & \frac{\partial P_1}{\partial e_2} & \cdots & \frac{\partial P_1}{\partial e_n} \\ \frac{\partial P_2}{\partial e_1} & \frac{\partial P_2}{\partial e_2} & \cdots & . \\ . & . & \cdots & . \\ . & . & \cdots & . \\ \frac{\partial P_n}{\partial e_1} & . & \cdots & \frac{\partial P_n}{\partial e_n} \end{bmatrix}^{-1} \times \begin{bmatrix} \Delta P_1 \\ \Delta P_2 \\ . \\ . \\ \Delta P_n \end{bmatrix} \quad (2)$$

For the case where the second order terms are not known this equation becomes expression (3).

$$\begin{bmatrix} \Delta e_1 \\ \Delta e_2 \\ . \\ . \\ \Delta e_n \end{bmatrix} = \begin{bmatrix} \frac{\partial P_1}{\partial e_1} & 0 & \cdots & 0 \\ 0 & \frac{\partial P_2}{\partial e_2} & \cdots & . \\ . & . & \cdots & . \\ . & . & \cdots & . \\ 0 & . & \cdots & \frac{\partial P_n}{\partial e_n} \end{bmatrix}^{-1} \times \begin{bmatrix} \Delta P_1 \\ \Delta P_2 \\ . \\ . \\ \Delta P_n \end{bmatrix} \quad (3)$$

Since the individual fuel pellet enrichments may be allowed to vary, as necessary to satisfy local peaking requirements, for example, the lattice average enrichment may not be conserved as evidenced by expression (4):

$$\sum_{i=1}^{n} \Delta e_i \neq 0 \quad (4)$$

In most cases, small variations from lattice average enrichment may be reasonable and necessary, given that there may be little sensitivity to bundle enrichment. There may be, however, a substantially more significant impact on long range goals, such as reload batch size or batch discharge exposure target,s if this variation is too great. The enrichment changes may be "re-normalized" in an attempt to hold average enrichment constant. This normalization may be performed by making a constant change ($\delta$) in the local peaking factors in every fuel rod, for example, as shown in expression (5).

$$\begin{bmatrix} \Delta e_1 \\ \Delta e_2 \\ . \\ . \\ \Delta e_n \end{bmatrix} = \begin{bmatrix} \frac{\partial P_1}{\partial e_1} & 0 & \cdots & 0 \\ 0 & \frac{\partial P_2}{\partial e_2} & \cdots & . \\ . & . & \cdots & . \\ . & . & \cdots & . \\ 0 & . & \cdots & \frac{\partial P_n}{\partial e_n} \end{bmatrix}^{-1} \times \begin{bmatrix} \Delta P_1 + \delta \\ \Delta P_2 + \delta \\ . \\ . \\ \Delta P_n + \delta \end{bmatrix} \quad (5)$$

If a boundary condition in expression (6) is applied:

$$\sum_{i=1}^{n} \Delta e_i = 0 \quad (6)$$

and several terms are defined as follows (to make the presentation more compact, for example):

$$p^{-1} = \begin{bmatrix} \frac{\partial P_1}{\partial e_1} & 0 & \cdots & 0 \\ 0 & \frac{\partial P_2}{\partial e_2} & \cdots & . \\ . & . & \cdots & . \\ . & . & \cdots & . \\ 0 & . & \cdots & \frac{\partial P_n}{\partial e_n} \end{bmatrix}^{-1}$$

$$a = \begin{bmatrix} 1 \\ 1 \\ . \\ . \\ 1 \end{bmatrix} \quad a^T = [\, 1 \; 1 \; . \; . \; 1 \,]$$

$$\vec{\Delta P} = \begin{bmatrix} \Delta P_1 \\ \Delta P_2 \\ . \\ . \\ \Delta P_n \end{bmatrix} \quad \vec{\delta} = \begin{bmatrix} 1 \\ . \\ . \\ . \\ 1 \end{bmatrix} \delta = a\delta$$

the conservation equation defining ($\delta$) becomes expression (8):

$$a^T \vec{\Delta e} = \sum_{i=1}^{n} \Delta e_i = a^T P^{-1} \vec{\Delta P} + a^T P^{-1} a\delta = 0 \quad (7)$$

or $$\delta = -\frac{a^T P^{-1} \vec{\Delta P}}{a^T P^{-1} a}. \quad (8)$$

R-Factors

A change to fuel rod R-factors may be equivalent to changing the fuel rod local peaking factors, since an R-factor value is related to fuel rod local peaking factors as illustrated by the following expression (9):

$$\Delta R\_factor_i = \left(\frac{T}{F}\right)^{\frac{1}{2}} \left[\frac{\frac{1}{2}(\bar{r}_i)^{-\frac{1}{2}} \times \Delta \bar{r}_i}{(1 + W_j n_j + W_k n_k)}\right] \quad (9)$$

where $r_i$ individual fuel rod local peaking;
$\Delta r_i$ change in fuel rod local peaking
T Total number of lattice positions;
F number of active rods;
$n_j$ number of nearest neighbor fuel rods;
$n_k$ number of diagonally adjacent fuel rods;
$W_j$ near neighbor weighting factor; and
$W_k$ diagonal neighbor weighting factor.

Other factors that are either not included in the lattice physics calculations or occur near the end of the bundle design process may be included by applying estimated biases to the local peaking and R-factors on select fuel rods. Examples may be Control Blade History effects on corner rod local peaking and rotated bundle delta R-factor critical power ratio (CPR). There are reasonable generic "allowances" that can be incorporated into the process through the application of biases to account for these effects, for example.

In most uncontrolled cases, the exposure and axial peaking factor weighting can be ignored and only the fraction of the axial length occupied by the subject lattice need to be considered in equation (13).

Exposure Peaking

Figure 2:
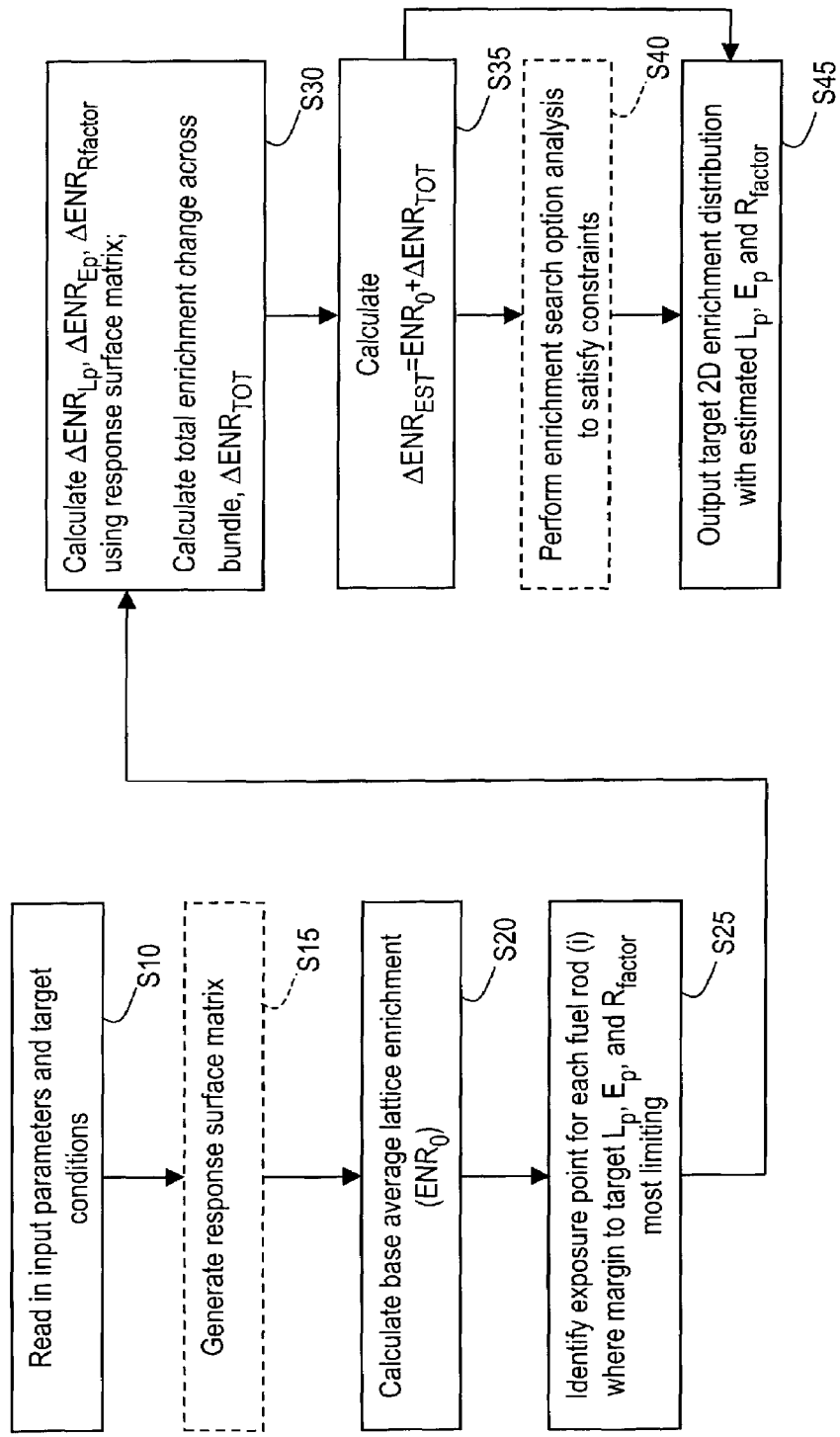
FIG. 2 is a flow chart describing the method in accordance with an exemplary embodiment of the invention.

Exposure peaking represents the relative exposure accumulated in each fuel pin during its residence in the nuclear reactor. In general, there are license limits that constrain the maximum value that is allowable. The response of the exposure peaking factor is related to the response of the pin local peaking factor by:

$$\Delta Ep_i(\text{EXP}) = \rho_i \times \int_0^{\text{EXP}} \Delta r_i(t) dt$$

where $\Delta E_i$ change in fuel pin exposure peaking factor
$\rho_I$ density weighting factor
$\Delta r_i$ change in fuel pin i local peaking factor
EXP lattice average exposure FIG. 2 is a flow chart describing the method in accordance with an exemplary embodiment of the invention. In FIG. 2 input parameters and target conditions are initially read in to processor 110 (Step S10). For example, user 130 may input certain characteristics to processor 110 such as desired user input of target local peaking values and target R-factor valuesbundle data of a base fuel bundle lattice design that is to be evaluated, R-factor data of the base lattice design as well as lattice data such as lattice enrichment and response surface data such as local peaking and R-factor derivatives, for example.

Optionally, a response surface matrix may be generated at this time (Step S15). However, a response surface matrix as described previously may have already been generated and stored in memory 120, for access by one of the processors 110 and/or calculation servers 150, for example.

A base average lattice enrichment may be calculated (Step S20). This value may be an integrated enrichment value across the entire fuel bundle of the base fuel bundle lattice design. The base average lattice enrichment may be determined, since some of the user input parameters include R-factor, and/or local peaking and/or exposure peaking values of a base lattice design, which are used in order to calculate the base average lattice enrichment. Alternatively, the average lattice enrichment can be a set value obtained from a previously evaluated fuel bundle design, for example.

For each fuel rod in the fuel bundle, exposure points may be determined (Step S25) where a margin to a target local peaking factor and a target R-factor are most limiting (i.e., closest to a constraint such as a thermal limit). The target local peaking, target bundle R-factor and a target lattice average enrichment may comprise target conditions that are input at Step S10 and may be determined via interpolation using the BUNGI program, as described above with regard to expressions describing the response surface matrix. An exposure point is at a point in a core energy cycle, typically measured in mega-watt days per short time (MWD/st), where core exposure is the amount of burn over an entire core energy cycle. If a change in enrichment can be determined so as to increase margins at these most limiting points, than an improve field bundle lattice design may be obtained which satisfied target local peaking and R-factor requirements. The exposure peaking target may also be input to limit the peak pellet exposure. This input usually only applies near the maximum lattice design exposure point.

Using the response surface matrix, which may be stored in memory 120 or which may be generated at Step S15, changes in enrichments may be calculated with regard to both local peaking, exposure peaking and R-factor (Step S30). Optionally the exposure peaking response may be estimated by numerically integration of the local peaking response matrix. In particular, the response of which matrix is being used to determine changes in enrichment for these identified limiting areas in the fuel bundle, for example, the response service matrix will evaluate the original or base lattice base fuel bundle lattice design, look at the target conditions such as target local peaking, target exposure peaking and target R-factor, and calculate pin-by-pin enrichment changes across the entire fuel bundle in an effort to meet the target conditions. The estimated average enrichment, ENRest, may be calculated by adding a total integrated enrichment change across the entire bundle, $\Delta$ENRtot to the base average lattice enrichment (ENRO) (Step S35). At this point, processor 110, via graphical user interface GUI 145, may output a suitable graphical display such as a target two-dimensional (2D) enrichment distribution map, and additional enrichment data related to estimated local peaking and estimated R-factor values, based on the applied enrichment change (Step S45).

Optionally, the estimated average lattice enrichment value may be subject to an enrichment search option analysis at Step S40 (shown in dotted line format) to confirm that the fuel bundle with the estimated average lattice enrichment satisfies all constraints. Constraints may be embodied as, and inclusive of, the target conditions and/or performance data which may have been input by user 130. Steps S40 and S50 are described in further detail later in this disclosure.

Figure 3:
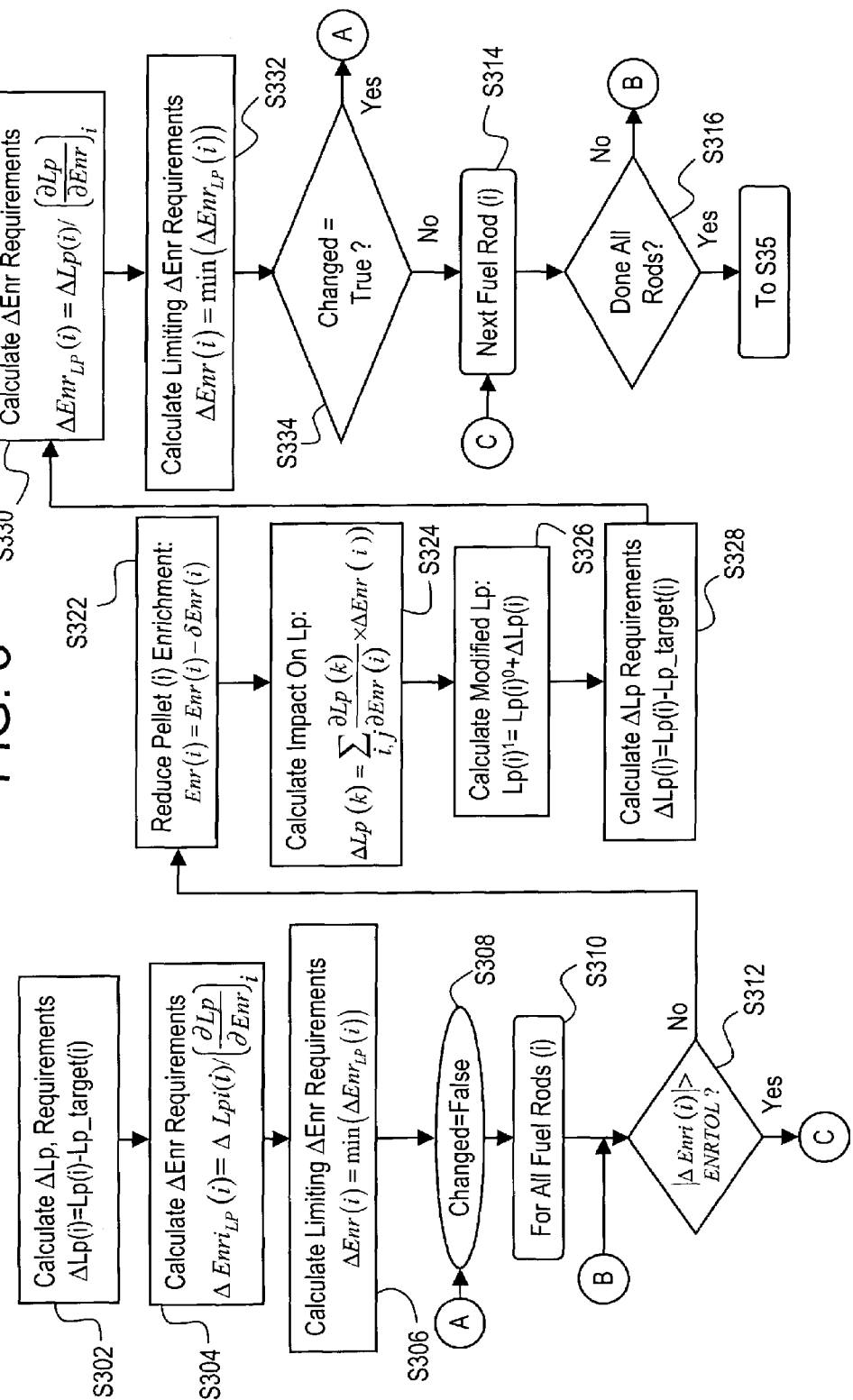
FIG. 3 is a flow chart illustrating an enrichment search option aspect of the method in accordance with an exemplary embodiment of the invention.

FIG. 3 is a flow chart illustrating the calculation of enrichment in accordance with an exemplary embodiment of the invention. FIG. 3 describes an iterative process to calculate change in enrichment based on local peaking. The process illustrated in this figure may be generalized to include exposure peaking and R-factor, for each pin or fuel rod within the fuel bundle. Notations (i) reflect that fact that the process is followed for each rod. Similarly, notation (k) identifies that much of the information is exposure dependent. For clarity, exposure peaking and R-factor characteristics are not included in the figures.

Referring to FIG. 3, initially, change in local peaking requirements is determined (Step S302) as a difference between the local peaking values in the base fuel bundle lattice design and the target local peaking requirements determined from the BUNGI computer program. From these requirements, the change in enrichment requirements with respect to local peaking and R-factor (Step S304) may be determined as a function of the change in local peaking and therefore change in exposure peaking and R-factor. By dividing the change in local peaking requirement by the derivative of change in local peaking to change in enrichment, a resultant change in enrichment requirement is determined. The result of Step S304 provides individual pin-by-pin change in enrichment values that may be apportioned in two separate tables, for example, one for local peaking, one for exposure peaking and one for R-factor.

From each of those tables, a limiting change in enrichment may be determined (Step S306). In particular, a fuel rod is selected that has the most limiting enrichment change from the calculated enrichment changes, based on target local peaking and target bundle R-factor. The most limiting change may represent the smallest enrichment change from the base fuel bundle lattice design, for example. As will be seen further, this change in enrichment ($\Delta ENR(i, j)$) may be compared (Step S312) against an acceptable tolerance for enrichment (ENRTOL). If the most limiting enrichment change is within the tolerance, (Step S312 output is YES) then the next most limiting fuel rod is evaluated (Step S314) until there are no further locations in the lattice design (output of Step S316 is YES) that might limit the target conditions. Estimated average lattice enrichment (Step S35 of FIG. 2) may then be calculated.

If the most limiting enrichment is outside ENRTOL, i.e., the output of Step S312 is NO, then enrichment in a pellet in the selected fuel is reduced by a given amount (Step S322). This amount may be a function of the value $\delta$ described in expression (8).

Once pellet enrichment has been changed locally at one fuel rod, this may have an impact on the entire fuel bundle average lattice enrichment. Accordingly, the impact on local peaking, exposure peaking and R-factor across the fuel bundle lattice design is calculated (Step S324) using the response surface matrix. Once the impact across the bundle is calculated, modified local peaking, exposure peaking and R-factors may be calculated (Step S326) on a pin-by-pin basis, based on the changes in local peaking, changes in exposure peaking and change in R-factor due to the pellet enrichment change. Next, change in local peaking, exposure peaking and R-factor requirements (Step S328) and change in enrichment requirements (Step S330) may be calculated using the response surface matrix, similar to as was described with respect to Steps S302 and S304.

Further, a fuel rod from the two enrichment tables may be selected (Step S332) which has the most limiting enrichment change from the re-calculated, or modified enrichment changes, and compared again (Step S334) against the acceptable tolerance (ENRTOL). Accordingly, if this enrichment change, at this most limiting position, does not fall within ENRTOL (output of Step S334 is NO) the procedure is repeated and further pellet enrichment change reduction(s) may be made until no further pellet exceeds the acceptable tolerance. This may be described by iterative process steps S308, S310, S322 through S334, S314 and S316. Thus, once calculations are complete (each pin has been evaluated, output of Step S316 is YES), the total estimated average lattice enrichment may be calculated at Step S35 (see Step S318).

Figure 4:
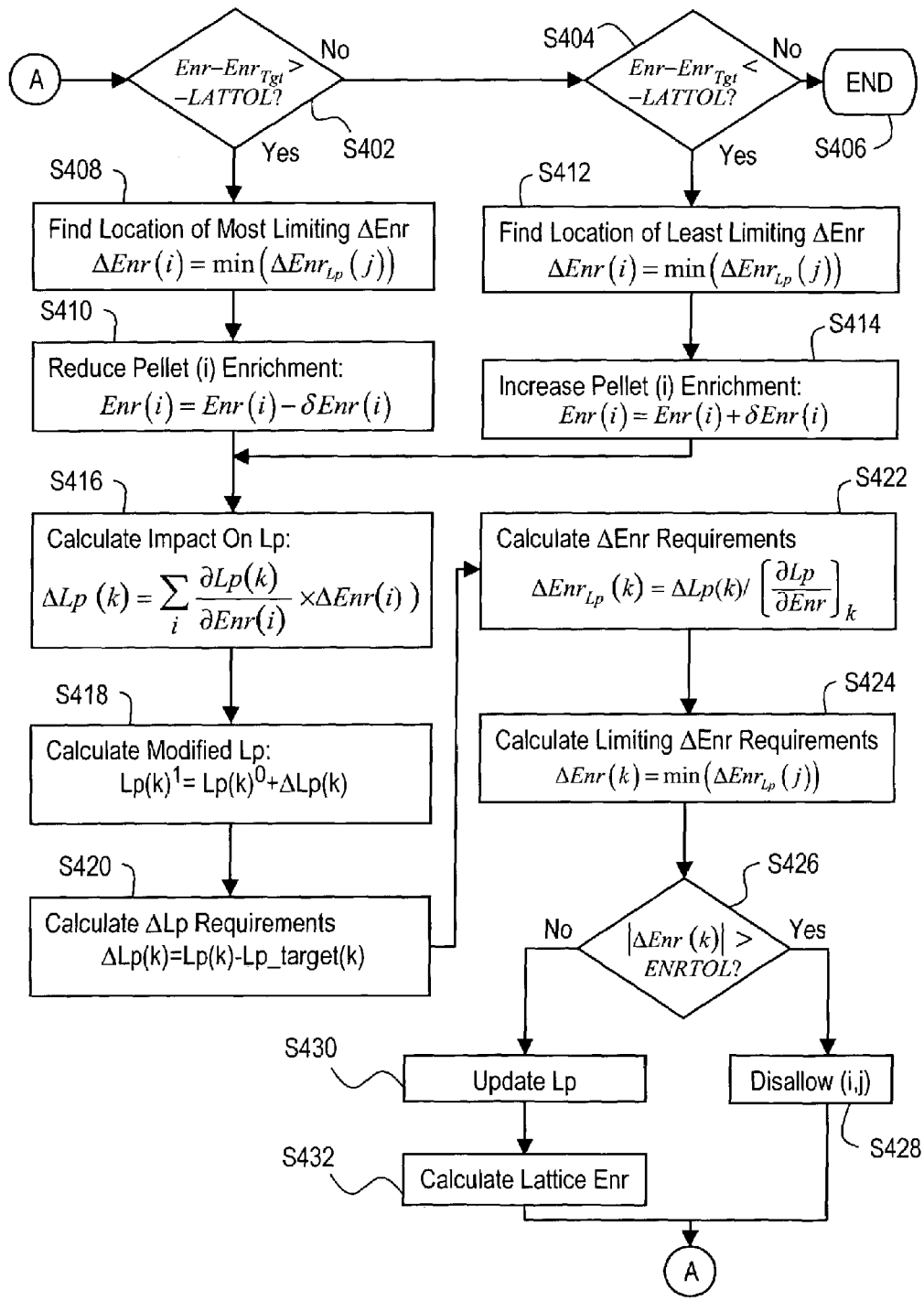
FIG. 4 is a flow chart illustrating a simplification option aspect of the method in accordance with an exemplary embodiment of the invention.

FIG. 4 is a flow chart illustrating an enrichment search option in accordance with an exemplary embodiment of the invention. The estimated average lattice enrichment calculated in Step S35 may be further evaluated by applying enrichment changes to a known average lattice enrichment of the base fuel bundle lattice design. A difference between this estimated lattice average enrichment and a target lattice average enrichment may be compared to a threshold, which may also be referred to as a lattice enrichment tolerance (LATTOL) such as shown at Step S402. The difference should equal the threshold for a proper result (e.g., to ensure that the estimated average lattice enrichment, if implemented in a particular core design, would meet all target conditions, constraints, etc. (See "END" at Step S406).

If the difference exceeds the threshold (output of Step S402 is YES) the following series of operations may be performed. Similar to FIG. 3, the fuel rod which has the most limiting enrichment change may be selected (Step S408), and a pellet in that fuel rod may have its enrichment reduced (Step S410) by a given amount. Additionally as discussed in FIG. 3, the impact on local peaking, exposure peaking and R-factor across the fuel bundle may be calculated (Step S416) using the response surface matrix, and modified local peaking, exposure peaking and R-factor values may be calculated on a pin-by-pin basis across the entire fuel bundle (Step S418). Further, the modified local peaking, exposure peaking and R-factor values may be evaluated against a target local peaking and target R-factor values (Step S420) to determine changes in local peaking and changes in R-factor to apply to the current fuel bundle lattice design. Enrichment change requirements may then be determined (Step S422) utilizing the response surface matrix.

From the resulting tables of enrichment changes, a limiting fuel rod with a limiting enrichment may be selected (Step S424) and compared against an enrichment tolerance (Step S426). If this change is outside of the enrichment tolerance band (output of step S426 is YES), then the perturbation of the fuel bundle begun at Step S410 is disallowed and another change may be made (repeat steps S402, S408, S410, S416, S418, S420, S422, S424 and S426).

If the limiting enrichment change falls within the enrichment tolerance (output of step S426 is NO), the local peaking, exposure peaking and R-factors may be updated (Step S430) in memory 120 and a new average lattice enrichment may be calculated Step S432) by calculation servers 150 and or processor 110 and compared against LATTOL once again (Step S402).

If the difference is still greater than the threshold, then the previous steps are repeated, however if the resulting pellet reduction has caused the difference to fall below the threshold, i.e., the output of Step S402 is NO and the output of Step S404 is YES, then an opposite iteration is performed, whereby the least limiting fuel rod is selected (Step S412), a pellet in the fuel rod has its enrichment increased (Step S414) then Steps S416, S118, S420, S422, S424 and S426 are repeated to determine whether or not the new or modified most limiting fuel rod is within an enrichment tolerance. Similarly to as described above, the perturbation is disallowed (Step S428) if the change enrichment is outside of the enrichment tolerance (the output of Step S426 is YES), but accepted if within ENRTOL (output of Step S426 is NO)

with the local peaking and R-factors updated (Step S430) and a new estimated average lattice enrichment value calculated (Step S432). This process may be iteratively repeated until the difference between the estimated enrichment and the target enrichment equals the threshold (Step S406).

Response Surface Matrix

In order to collect the partial derivatives of how enrichment affects local peaking and R-factors, a response surface model was developed. The response surface model included the exposure dependent local peaking and R-factor response for every pin in a 10×10 fuel bundle lattice design as a function of a change in enrichment in every pin. As a result, roughly 1,500,000 (=10i×10j×10i×10j×30 exposures×5 lattices) partial derivatives were calculated and stored in a database.

In order to prepare the database, almost 50 fuel bundles were individually modeled, with the bundle characteristics, including local peaking, exposure peaking and R-factor data for each pin in each modeled bundle stored in a database. Once the response surface was determined, there were interesting results. The derivatives of the response surface matrix were far less sensitive to the initial conditions. The derivatives provided extremely accurate predictions, regardless of the initial enrichments in a modeled fuel bundle. Consequently, substantially perfect or perfectly optimized bundles could be generated in just a few iterations. Moreover, one of the rows and columns were removed from the 10×10 matrix and the database was modified to include a 9×9 matrix for fuel assemblies have a 9×9 lattice design. This "generic" response surface has been found to be accurate on other lattice types. Hence, a single database has been created that may be useful for all types of fuel. Because it took a relatively small amount of time to make predictions from the database, relatively accurate predictions of a fuel bundle's response could be determined in less than a minute, compared to over four (4) hours it took to generate a bundle through conventional "rules of thumb" processes.

EXAMPLES

For the purposes of FIGS. 5A-8B, and in order to distinguish results of the method and arrangement of the present invention from a base lattice design or target lattice design, a fuel bundle lattice design developed in accordance with exemplary embodiments of the present invention is referred to in these figures as an AUTOBUN lattice design, it also being understood that AUTOBUN is merely a label being applied to the lattice design developed by the exemplary embodiments of the present invention.

The following example involves an iteration of a GE12 fuel bundle from a preliminary to a final equilibrium design, which involved three stages. In the first stage, linear reactivity methods were used to determine the approximate equilibrium cycle reload enrichment. There were no known GE12 "D" lattice bundles at the desired enrichment level. A preliminary GE12 design was selected based on release cycle designs for the same application. The first application of the method and arrangement in accordance with the exemplary embodiments of the invention was to adjust the lattice enrichment using the base bundle local peaking and R-factors as a target. The second application involved iterating on the lattice designs to achieve new local peaking and R-factor targets. This iteration is illustrated in a local peaking, R-factor iteration example that follows further below. For this example, the base lattice enrichment was 4.491 wt % U235. Linear reactivity estimates indicated a target lattice enrichment of 4.31 wt % U235.

FIGS. 5A and 5B illustrate 2D lattice enrichment distributions for a fuel bundle modeled in accordance with the exemplary embodiment of the invention. FIGS. 5A and 5B show the 2-D lattice enrichment distribution for each fuel rod (pin enrichment) in a fuel bundle before and after execution of the method in accordance with the exemplary embodiments of the invention. Fuel rods showing 0.0 is indicative of water rods of this particular 10×10 example. Application of this invention can be performed on fuel with or without water rods. Changes in pellet enrichments are indicated by '+' and '−' signs in FIG. 5B. As shown in FIG. 5B, average U235 enrichment across the bundle dropped from 4.491 to 4.293 by using the method and arrangement of determining pin enrichments in accordance with the exemplary embodiments of the invention.

Figure 6A:
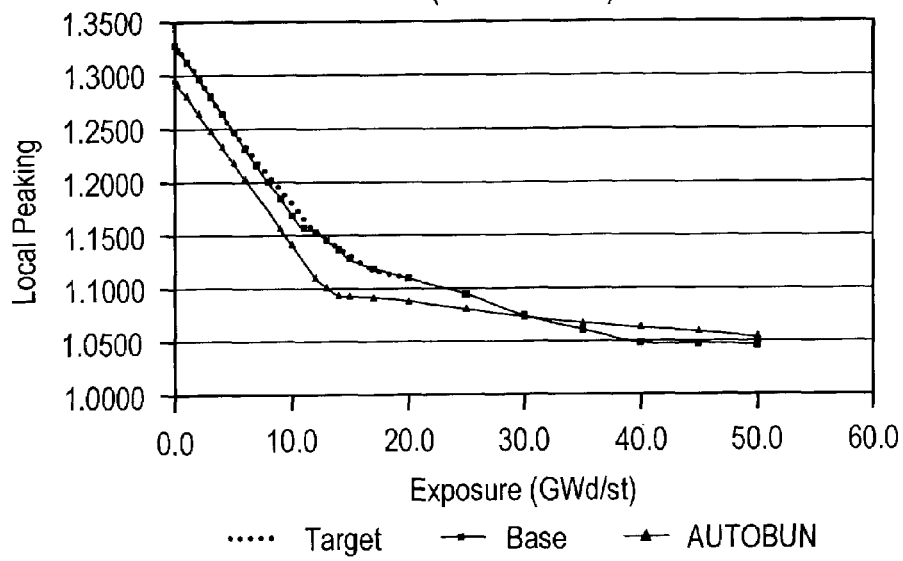
FIGS. 6A and 6B illustrate local peaking and R-factor characteristics for a fuel bundle modeled in accordance with an exemplary embodiment of the invention.
Figure 6B:
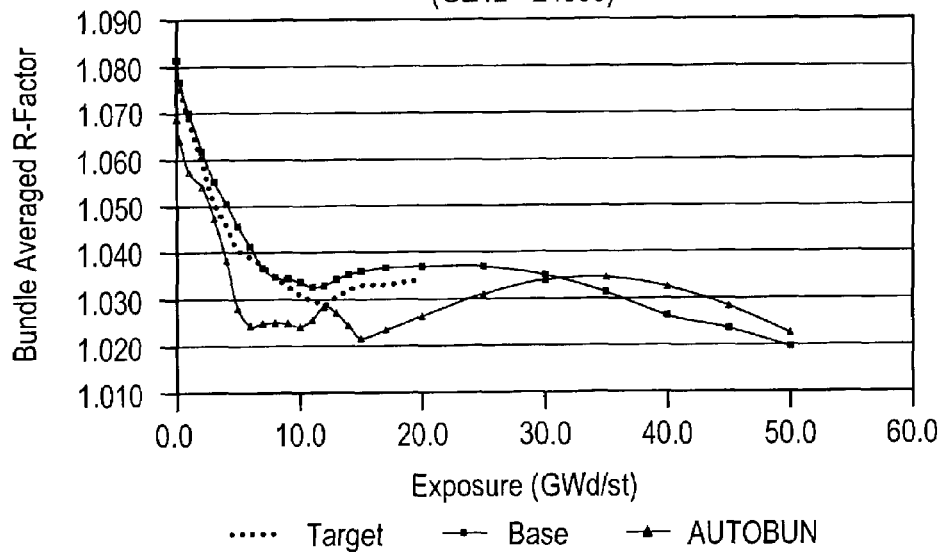

FIGS. 6A and 6B illustrate local peaking and R-factor characteristics for a fuel bundle modeled in accordance with an exemplary embodiment of the invention The input target local peaking and R-factors were similar to those of the base lattice design. As previously described, the enrichment analysis algorithm in accordance with exemplary embodiments of the invention reduces the enrichment of the most limiting pellet. The impact may be seen in the local peaking and R-factor plots of FIGS. 6A and 6B, where the estimated values for local peaking and R-factor are well below the original values for the AUTOBUN base lattice design.

Figure 8A:
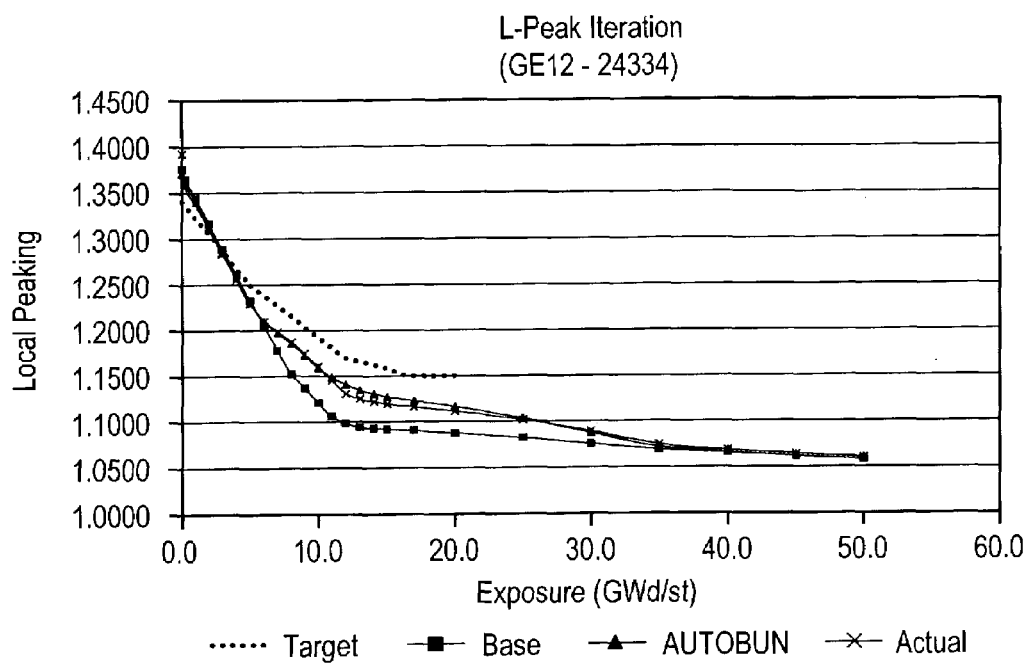
FIGS. 8A and 8B illustrate local peaking and R-factor characteristics after core simulation of a fuel bundle determined in accordance with an exemplary embodiment of the invention.
Figure 8B:
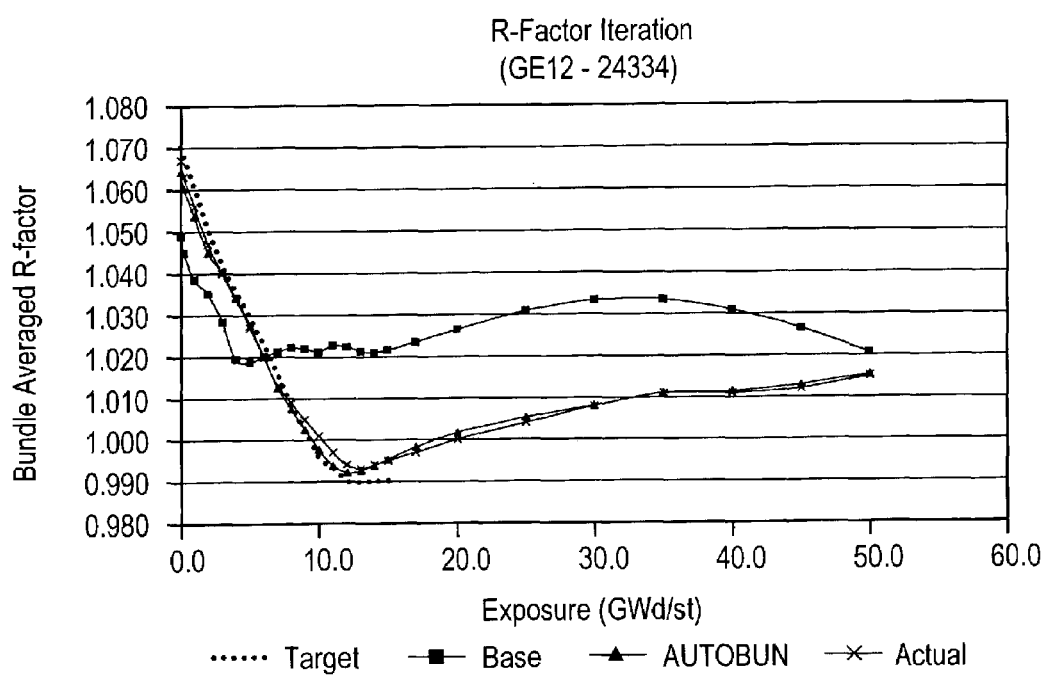

FIGS. 7A and 7B illustrate 2D lattice enrichment distributions after core simulation of a fuel bundle determined in accordance with an exemplary embodiment of the invention; and FIGS. 8A and 8B illustrate local peaking and R-factor characteristics after core simulation of a fuel bundle determined in accordance with an exemplary embodiment of the invention.

In this second example, the reduced bundle average enrichment design from AUTOBUN in the previous example was evaluated in a core simulation of the fuel bundle. From the simulation, it was determined that the gadolinia (e.g., poison pins) in the fuel rods (pins) needed to be modified. The gad loading was changed based on reactivity change requirements, independent of local peaking and R-factors. The core simulations analysis was repeated with this second design. The cycle energy and reactivity margins were sufficiently close to the targets to validate a BUNGI run, to get local peaking and R-factor targets. In other words, and in the case of lattice design where the lattice local peaking and R-factors is a concern, targets or goals are needed in the form of exposure dependent limits. One source for this input is a BUNGI computer program. BUNGI furnishes both exposure dependent local peaking and exposure dependent R-factor targets. Accordingly, the results of this local peaking and R-factor iteration are shown in FIGS. 7A-8B.

FIGS. 7A and 7B show the 2-D lattice enrichment distribution before and after the AUTOBUN execution. Changes in pellet enrichments are indicated by '+' and '−' signs in FIG. 14. The Local peaking and R-factor characteristics are shown in FIGS. 8A and 8B. From FIG. 8B, it may be seen that a substantial change in R-factor was required from the base GE12 design. The AUTOBUN predicted, and actual local peaking and R-factor characteristics agree quite well indicating that, at least for a 10×10 lattice, the method and arrangement in accordance with the exemplary embodiments of the invention may have sound predictive capabilities.

FIG. 8A shows that there exits a significant difference between the target and achieved local peaking. This is because the enrichment change to effect the local peaking change was less than the input enrichment tolerance (−0.14 versus ±0.21). If it were necessary to achieve a lower local peaking factor, then the enrichment tolerance input could be reduced. Reducing the enrichment tolerance may force a stricter adherence to the target peaking requirements, but also may generally yield a lower lattice average enrichment.

The exemplary embodiments of the present invention being thus described, it will be obvious that the same may be varied in many ways. Such variations are not to be regarded as a departure from the spirit and scope of the invention, and all such modifications as would be obvious to one skilled in the are intended to be included within the scope of the following claims.

What is claimed:

1. A computer-implemented method of determining pin enrichments for a fuel bundle of a nuclear reactor, comprising:
   inputting a plurality of input parameters pertaining to a fuel bundle;
   inputting a plurality of target conditions including each of a target local peaking value, a target exposure peaking value, a target bundle R-factor and a target lattice average enrichment for the fuel bundle;
   calculating enrichment changes to be made across the fuel bundle, using at least one computer executing response matrix technology so as to satisfy the target conditions; and
   outputting fuel bundle pin enrichment data that satisfies the target conditions.

2. The computer-implemented method of claim 1, wherein the input parameters include at least one of user performance criteria, base fuel bundle lattice design, R-factor data related to the base fuel bundle lattice design, and data related to a response surface model used in said calculating of enrichment changes.

3. The computer-implemented method of claim 2, wherein said calculating further includes using the response surface model to calculate pin-by-pin enrichment changes to be made across the fuel bundle so as to satisfy the target conditions.

4. The computer-implemented method of claim 3, wherein the response surface model is a matrix that defines relationships between the input parameters and the target conditions.

5. The computer-implemented method of claim 3, wherein the response surface model includes an exposure dependent local peaking response, an exposure peaking response and R-factor response for every pin in a N by N fuel bundle lattice design as a function of a change in enrichment in each pin in the N by N fuel bundle lattice design.

6. The computer-implemented method of claim 1, wherein said calculating further includes:
   determining an exposure point for each fuel rod where a margin to the target local peaking value is the most limiting, where a margin to the target exposure peaking value is the most limiting and where a margin to a target bundle R-factor is the most limiting;
   calculating a pin by pin enrichment change required based on the target local peaking value using a response surface matrix, separately based on target bundle maximum exposure peaking using the response surface matrix and separately based on target bundle R-factor using the response surface matrix;
   selecting a fuel rod that has the most limiting enrichment change from the calculated enrichment changes based on target local peaking value, exposure peaking value and target bundle R-factor, the most limiting change representing the smallest enrichment change from a base fuel bundle lattice design of the fuel bundle;
   reducing enrichment, by a given amount, in a pellet in the selected fuel rod where an enrichment change reduction is greater than an acceptable tolerance;
   calculating an impact on all pellet local peaking, exposure peaking and R-factors across the fuel bundle using the response surface matrix;
   re-calculating modified pin by pin enrichment changes using based on the impact;
   selecting a fuel rod that has the most limiting enrichment change from the re-calculated modified enrichment changes;
   searching for a pellet within the selected fuel rod that exceeds the acceptable tolerance; and
   updating current local peaking and R-factors if no further pellet is found to exceed the acceptable tolerance.

7. The computer-implemented method of claim 1, wherein said outputting further includes:
   outputting a two-dimensional enrichment distribution that satisfies target local peaking and target R-factor requirements.

8. The computer-implemented method of claim 1, further comprising:
   determining an estimated lattice average enrichment for a desired fuel bundle by applying the enrichment changes to a known average lattice enrichment of a base fuel bundle lattice design; and
   comparing a difference between the estimated lattice average enrichment and a target lattice average enrichment to a threshold.

9. The computer-implemented method of claim 8, wherein, if the difference exceeds the threshold, the method further comprises:
   determining which fuel rod has the most limiting enrichment change from the calculated enrichment changes based on target local peaking, target exposure peaking and target bundle R-factor, the most limiting change representing the smallest enrichment change from the base fuel bundle lattice design;
   reducing enrichment, by a given amount, in a pellet in the selected fuel rod where an enrichment change reduction is outside an acceptable tolerance;
   calculating an impact on all pellet local peaking, exposure peaking and R-factors in the fuel bundle using the response surface matrix;
   re-calculating modified pin by pin enrichment changes based on the impact;
   comparing the most limiting modified enrichment change to an enrichment tolerance; and
   calculating a revised estimated average lattice enrichment when the most limiting modified enrichment change is within the enrichment tolerance.

10. The computer-implemented method of claim 9, further comprising:
   iteratively repeating each of the steps of claim 9 until the difference equals the threshold; and
   outputting a two-dimensional enrichment distribution of the resultant fuel bundle lattice design that meets local peaking, exposure peaking and R-factor target conditions.

11. The computer-implemented method of claim 8, wherein, if the difference is less than the threshold, the method further comprises:
   determining which fuel rod has the least limiting enrichment change from the calculated enrichment changes based on target local peaking, target exposure peaking and target bundle R-factor, the least limiting change representing the largest enrichment change from the base fuel bundle lattice design;
   increasing enrichment, by a given amount, in a pellet in the selected fuel rod where an enrichment change increase is outside an acceptable tolerance;
   calculating an impact on all pellet local peaking, exposure peaking and R-factors in the fuel bundle using the response surface matrix using the response surface matrix;
   re-calculating modified pin by pin enrichment changes based on the impact;
   comparing the most limiting modified enrichment change to an enrichment tolerance; and
   calculating a revised estimated average lattice enrichment, if the most limiting modified enrichment change is within the enrichment tolerance.

12. The computer-implemented method of claim 11, further comprising:
   iteratively repeating the steps of claim 11 until the difference equals the threshold; and
   outputting a two-dimensional enrichment distribution of the resultant fuel bundle lattice design that meets local peaking, exposure peaking and R-factor target conditions.

13. The computer-implemented method of claim 1, further comprising:
   determining an estimated lattice average enrichment for the fuel bundle by applying the enrichment changes to a known average lattice enrichment of a base fuel bundle lattice design;
   storing a list of pellet types useable in the fuel bundle and a list of pellet locations to perturb in the fuel bundle;
   recursively creating an array of test fuel bundle lattice designs for the fuel bundle using the perturbed pellet locations, and
   for each test fuel bundle lattice design:
      calculating an impact of particular pellet type(s) on all pellet local peaking, exposure peaking and R-factors in the test fuel bundle lattice design using the response surface matrix;
      calculating pin by pin enrichment changes based on the impact using the response surface matrix;
      comparing a most limiting enrichment change in the test fuel bundle lattice design to a tolerance; and
      calculating a revised estimated average lattice enrichment for those test fuel bundle lattice designs having a most limiting enrichment change that is within the tolerance.

14. The computer-implemented method of claim 13, further comprising
   selecting a test fuel bundle lattice design from the test fuel bundle lattice designs where revised estimated average lattice enrichment were calculated based on the fewest number of pellet types used in the design; and
   outputting a two-dimensional enrichment distribution of the selected test fuel bundle lattice design.

15. A computer-implemented method of determining pin enrichments for a fuel bundle of a nuclear reactor, comprising:
   using a computer-implemented response surface model to calculate pin-by-pin enrichment changes to be made across the fuel bundle so as to satisfy target conditions, the target conditions including each of a target local peaking value, a target exposure peaking value, a target bundle R-factor and a target lattice average enrichment for the fuel bundle, wherein the response surface model defines relationships between input parameters which include at least one of user performance criteria, base fuel bundle lattice design, R-factor data related to the base fuel bundle lattice design and data related to the response surface model, and the target conditions; and
   outputting a two-dimensional enrichment distribution for the fuel bundle providing modified pin-by-pin enrichments that satisfies target local peaking and target R-factor requirements.

16. An apparatus for determining pin enrichments for a fuel bundle of a nuclear reactor, comprising:
   inputting means for inputting a plurality of input parameters and target conditions pertaining to a fuel bundle, the target conditions including each of a target local peaking value, a target exposure peaking value, a target bundle R-factor and a target lattice average enrichment for the fuel bundle;
   calculating means for calculating enrichment changes to be made across the fuel bundle, using at least one computer executing response matrix technology so as to satisfy the target conditions; and
   outputting means for outputting fuel bundle pin enrichment data that satisfies the target conditions.

17. The apparatus of claim 16, wherein the input parameters include at least one of user performance criteria, base fuel bundle lattice design, R-factor data related to the base fuel bundle lattice design and data related to a response surface model included in the calculating means.

18. The apparatus of claim 16, wherein said inputting means include one or more of an input device, communication medium and interface for inputting the plurality of input parameters and target conditions.

19. The apparatus of claim 17, wherein the interface is a web-based internet browser.

20. The apparatus of claim 16, wherein said calculating means include one or more of a host computer, memory and a plurality of calculation servers.

21. The apparatus of claim 16, wherein said outputting means include one or more of a host processor, interface, communication medium and terminal unit.

22. The apparatus of claim 21, wherein the interface is a graphical user interface.

23. The apparatus of claim 16, wherein said calculating means employs a response surface model to calculate pin-by-pin enrichment changes to be made across the fuel bundle so as to satisfy the target conditions.

24. The apparatus of claim 23, wherein the response surface model is a matrix that defines relationships between the input parameters and the target conditions.

25. The apparatus of claim 23, wherein the response surface model includes an exposure dependent local peaking and R-factor response for every pin in a N by N fuel bundle lattice design as a function of a change in enrichment in each pin in the N by N fuel bundle lattice design.

* * * * *